(12) United States Patent
Hirose et al.

(10) Patent No.: US 8,614,715 B2
(45) Date of Patent: Dec. 24, 2013

(54) MOVING IMAGE FILE PRODUCING METHOD, COMPUTER PROGRAM PRODUCT AND ELECTRONIC CAMERA

(75) Inventors: Keiichi Hirose, Tokyo (JP); Kazuya Umeyama, Tokyo (JP); Hiromi Kuwata, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/067,928

(22) Filed: Jul. 7, 2011

(65) Prior Publication Data

US 2011/0268419 A1 Nov. 3, 2011

Related U.S. Application Data

(63) Continuation of application No. 11/706,320, filed on Feb. 15, 2007, now abandoned.

(30) Foreign Application Priority Data

Feb. 20, 2006 (JP) ................................ 2006-042539

(51) Int. Cl.
*G06T 13/00* (2011.01)

(52) U.S. Cl.
USPC ......................................... 345/473; 345/530

(58) Field of Classification Search
USPC ........ 358/471; 348/231.6; 382/305; 386/121; 369/30.3
See application file for complete search history.

(56) References Cited

U.S. PATENT DOCUMENTS

| | | | |
|---|---|---|---|
| 5,712,949 A | 1/1998 | Kato et al. | |
| 2002/0033889 A1* | 3/2002 | Miyazaki | 348/232 |
| 2002/0118949 A1* | 8/2002 | Jones et al. | 386/68 |
| 2002/0154158 A1 | 10/2002 | Fukuda et al. | |
| 2003/0007784 A1 | 1/2003 | Loui et al. | |
| 2004/0022522 A1 | 2/2004 | Terada | |
| 2004/0114904 A1* | 6/2004 | Sun et al. | 386/46 |
| 2005/0134939 A1* | 6/2005 | Ikeda et al. | 358/471 |
| 2005/0201718 A1 | 9/2005 | Kato | |
| 2006/0056806 A1* | 3/2006 | Terakado et al. | 386/69 |
| 2006/0077771 A1* | 4/2006 | Ohno et al. | 369/30.3 |
| 2006/0083442 A1* | 4/2006 | Loukipoudis et al. | 382/305 |
| 2006/0114327 A1* | 6/2006 | Araya et al. | 348/207.99 |
| 2006/0114763 A1* | 6/2006 | Nakamae et al. | 369/30.28 |
| 2006/0221222 A1* | 10/2006 | Hirasawa | 348/333.01 |
| 2006/0244847 A1* | 11/2006 | Nagaoka et al. | 348/231.99 |
| 2007/0019932 A1* | 1/2007 | King et al. | 386/121 |

FOREIGN PATENT DOCUMENTS

| | | |
|---|---|---|
| EP | 1 431 887 A2 | 6/2004 |
| EP | 1 498 899 A1 | 1/2005 |
| JP | 10-70703 | 3/1998 |
| JP | A-10-200843 | 7/1998 |
| JP | A-2001-285784 | 10/2001 |
| JP | A-2002-016871 | 1/2002 |

(Continued)

OTHER PUBLICATIONS

Sep. 21, 2010 Office Action issued in Japanese Patent Application No. 2006-042539 (with translation).
"Life* with PhotoCinema 3" from Digitalstage Inc., searched on Nov. 7, 2012, via the Internet, http://www.digitalstage.jp/life/index.html, (with translation).

(Continued)

*Primary Examiner* — Phi Hoang
(74) *Attorney, Agent, or Firm* — Oliff & Berridge, PLC (57) ABSTRACT

A moving image file producing method includes: inputting an image material; inputting a scenario information; and producing a moving image file that contains the image material based on the scenario information.

14 Claims, 6 Drawing Sheets

(56) References Cited

FOREIGN PATENT DOCUMENTS

| | | |
|---|---|---|
| JP | A-2002-024846 | 1/2002 |
| JP | A 2002-342771 | 11/2002 |
| JP | A-2004-064396 | 2/2004 |
| JP | A 2004-336566 | 11/2004 |
| JP | A-2005-210350 | 8/2005 |

OTHER PUBLICATIONS

"Digicam de!! Movie Theater 3" from A.I. Soft Inc., searched on Nov. 9, 2012 via the Internet, http://www.epson.jp/products/ai/dcmt/feature/feature01.htm, (with translation).

"Imaginate 2.0 Visual Effects Software, Still Image Animation" from Grass Valley Inc. searched on Nov. 7, 2012, via the Internet, http://www.fullcompass.com/product/346521.html.

* cited by examiner

MOVING IMAGE FILE PRODUCING METHOD, COMPUTER PROGRAM PRODUCT AND ELECTRONIC CAMERA

INCORPORATION BY REFERENCE

The disclosure of the following priority application is herein incorporated by reference:

This is a Continuation of application Ser. No. 11/706,320 filed Feb. 15, 2007, which in turn claims priority of Japanese Application No. 2006-042539 filed Feb. 20, 2006.

BACKGROUND OF THE INVENTION

1. Field of the Invention

The present invention relates to a moving image file producing method, a computer program product, and an electronic camera.

2. Description of the Related Art

The sequential playback of still images (so-called slide show) using the still image of the same format as that of the moving image and the auxiliary information thereof has been known as disclosed in Japanese Laid-Open Patent Publication No. 2004-336566.

SUMMARY OF THE INVENTION

Japanese Laid-Open Patent Publication No. 2004-336566 discloses that the still image data are stored at the still image data format, and the audio data are stored at the audio data format, respectively. Those still image data and audio data are displayed and played back in accordance with the control information which contains such data as the playback order. As the slide show is displayed while performing the command processing, the display timing may be delayed in the case where the employed CPU has the low capability.

According to the 1st aspect of the present invention, a moving image file producing method comprises: inputting an image material; inputting a scenario information; and producing a moving image file that contains the image material based on the scenario information.

According to the 2nd aspect of the present invention, in the moving image file producing method according to the 1st aspect, it is preferred that the scenario information contains an image material to be contained in the moving image file, an appearance order of the image material, a display time of the image material, and a video effect to be added.

According to the 3rd aspect of the present invention, in the moving image file producing method according to the 1st or the 2nd aspect, it is preferred that the method further comprises: inputting a music material; and containing the music material in the moving image file based on the scenario information, and the scenario information further contains a music material to be contained in the moving image file, a playback order of the music material, a playback time of the music material, and a sound effect to be added.

According to the 4th aspect of the present invention, in the moving image file producing method according to the 3rd aspect, it is preferred that the image material and the music material are input from an electronic camera.

According to the 5th aspect of the present invention, in the moving image file producing method according to the 4th aspect, it is preferred that: the method further comprises determining whether a memory unit stores a material with quality higher than that of a material input from the electronic camera; and when it is determined that the material with the higher quality exists, the material with the higher quality is to be contained in the moving image file to be produced instead of the material input from the electronic camera when producing the moving image file.

According to the 6th aspect of the present invention, in the moving image file producing method according to the 4th or the 5th aspect, it is preferred that a process of producing the moving image file is started upon completion of an input operation of the material from the electronic camera.

According to the 7th aspect of the present invention, in the moving image file producing method according to any one of the 1st through the 6th aspects, it is preferred that the input image material is re-sized conforming to a display unit to be used for a playback operation when producing the moving image file.

According to the 8th aspect of the present invention, in the moving image file producing method according to any one of the 1st through the 7th aspects, it is preferred that the method further comprises playing back the produced moving image file in response to a command from a user.

According to the 9th aspect of the present invention, in the moving image file producing method according to any one of the 1st through the 8th aspects, it is preferred that the method further comprises: deleting the input image material and scenario information after producing the moving image file.

According to the 10th aspect of the present invention, a computer readable computer program product comprises a program for producing a moving image file that allows a computer to execute the moving image file producing method according to any one of the 1st through the 9th aspects.

According to the 11th aspect of the present invention, an electronic camera comprises a scenario information producing unit that produces scenario information used for the moving image file producing method according to any one of the 1st through the 9th aspects.

DESCRIPTION OF THE PREFERRED EMBODIMENT

The best mode for carrying out the present invention will be described referring to the drawings.

<Moving Image File Producing/Playback System>

Figure 1:
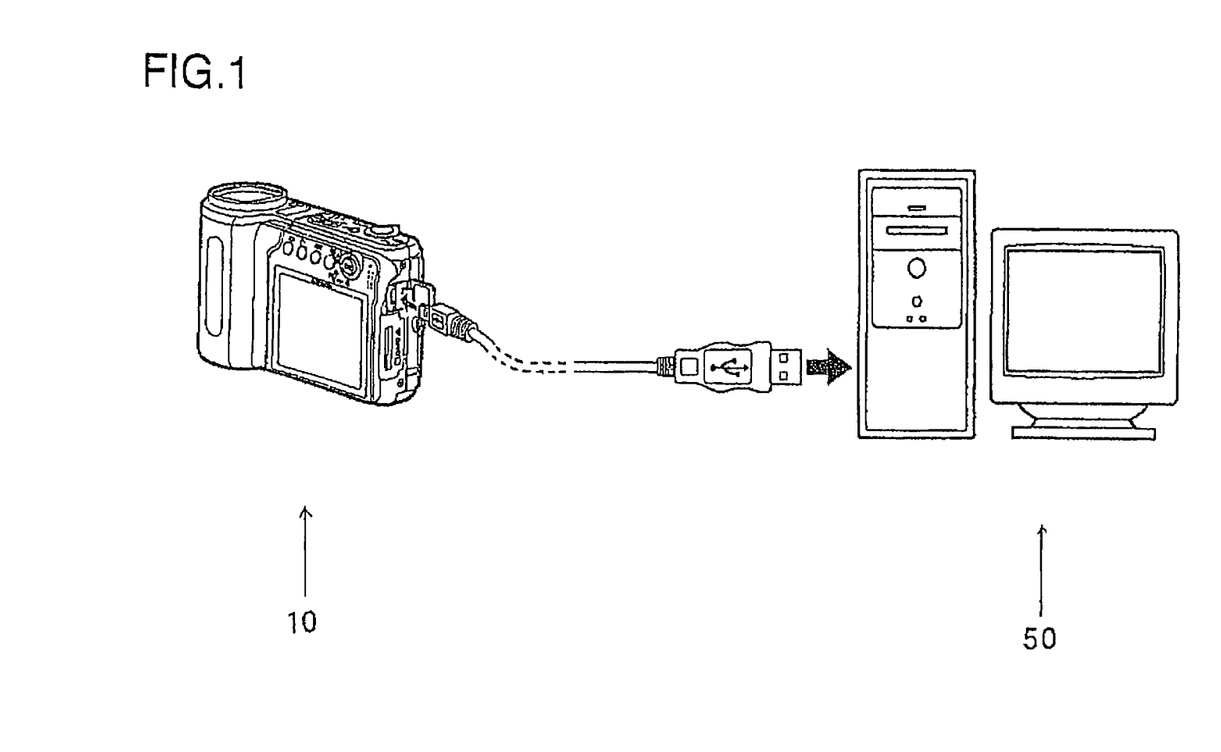
FIG. 1 is an explanatory view of a moving image file producing/playback system according to an embodiment of the invention.

FIG. 1 is an explanatory view of an electronic camera (a digital camera) system according to an embodiment of the invention. The electronic camera system is formed of an electronic camera 10 and a personal computer (hereinafter referred to as a PC) 50. The PC 50 may be used for producing and playing back a moving image file by loading the moving image file producing/playback program so as to be executed. The loading of the program to the PC 50 may be performed by setting the recording medium that stores the program to the PC 50. Alternatively, the loading to the PC 50 may be performed via the network. It is to be noted that the term of "playback" may be referred to as "reproduce" or "reproduction".

Figure 5:
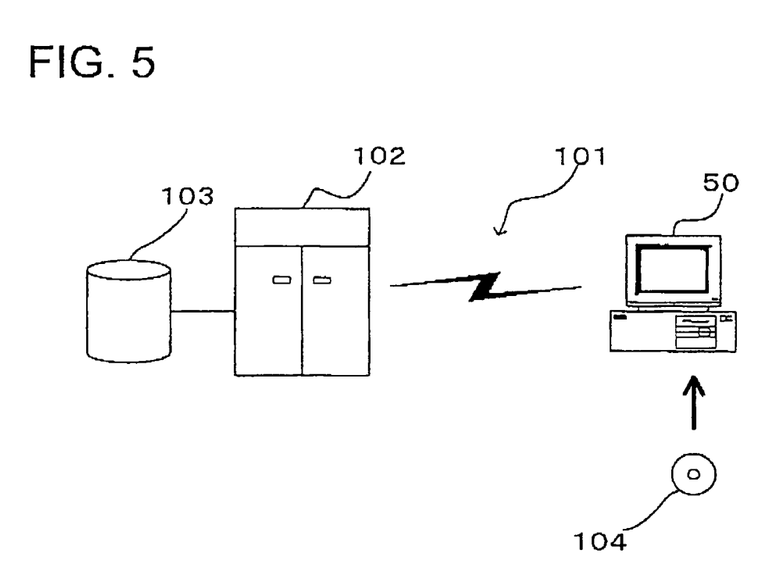
FIG. 5 is an explanatory view representing how the program is supplied to the PC.

The program may be supplied via the recording medium such as the CD-ROM and data signals through the internet as shown in FIG. 5. The PC 50 receives the program via a CD-ROM 104 and has a function for connecting a communication line 101. A computer 102 is a server computer that supplies the aforementioned program to be stored in the recording medium, for example, a hard disk 103. The communication line such as the internet or the exclusive communication line may be used as the communication line 101. The computer 102 reads the program from the hard disk 103, and transmits the program to the PC 50 via the communication line 101. In other words, the program is embodied on the carrier wave as the data signal so as to be transmitted via the communication line 101. The program may be supplied as the computer readable computer program product in various forms, for example, the recording medium, carrier wave and the like.

The PC 50 is allowed to communicate with the electronic camera 10. The communication between the PC 50 and the electronic camera 10 may be wired using the cable as shown in FIG. 1, or wireless via the wireless terminal (not shown).

<Electronic Camera>

The electronic camera 10 is structured to be switchable between the shooting (photography) mode and the playback mode. At the shooting mode, the electronic camera 10 shoots the object such that the thus shot image data are stored as the image file in the recording medium 30 shown in FIG. 2 formed as the memory card. In the case where the still image is shot, the still image file is stored. In the case where the movie is shot, the movie file is stored.

At the playback mode, the operation is switchable between the normal playback mode and the scenario playback mode. At the normal playback mode, the playback image of the image data obtained by reading the shot image data from the recording medium 30 is displayed on an LCD monitor 21 shown in FIG. 2. In the case where the audio (voice) data correlated with those to be played back and displayed are stored, the audio (voice) playback is performed by a sound playback unit 25 shown in FIG. 2 (described later).

Figure 2:
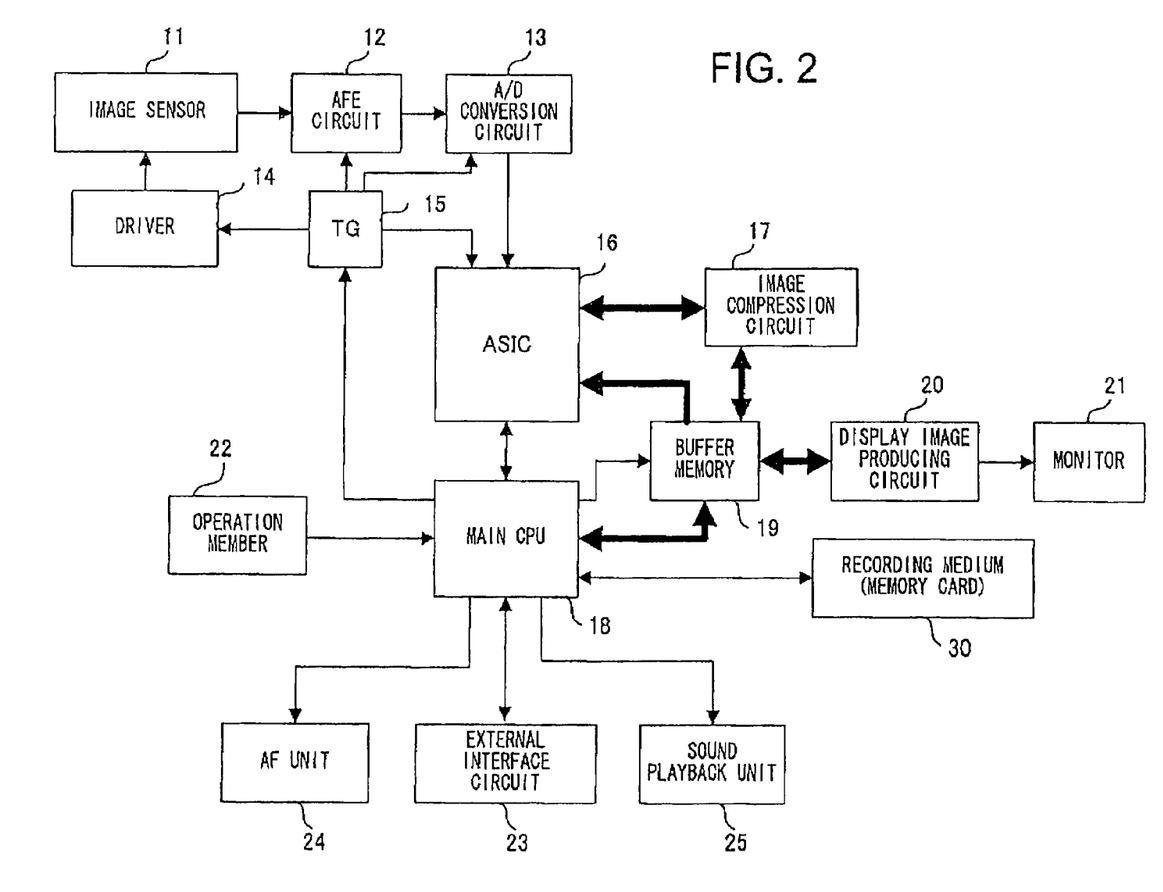
FIG. 2 is a block diagram showing main components of the electronic camera.

At the scenario playback mode, a moving image produced using the shot image data and the audio data are displayed on the LCD monitor 21 based on the playback scenario created by the electronic camera 10, and the audio playback is performed by the sound playback unit 25. The above moving image is defined as follows. A predetermined video effect, for example, fade in/out or panning is added to a still image when stored images are sequentially displayed like the so-called slide show so that the image is dynamically shown like a movie to the viewer. Such an image is defied as a moving image in this embodiment. The scenario in this case defines the method for playing back a plurality of shot image data to which the special video effect or the sound effect is added in a predetermined order.

The PC 50 and the electronic camera 10 are structured to enable the scenario playback, respectively in different ways. That is, the electronic camera 10 is structured to perform the scenario playback at the simple mode, and the PC 50 is structured to perform the scenario playback at the full mode.

The scenario playback will be further described in detail. FIG. 2 is a block diagram of a main structure of the electronic camera 10. Referring to FIG. 2, a timing generator (TG) 15 supplies a timing signal to a driver 14, an AFE (Analog Front End) circuit 12 and an A/D conversion circuit 13 in response to a command transmitted from a main CPU 18. The driver 14 supplies a drive signal required for an image sensor 11. The AFE circuit 12 performs the analog process (gain control) with respect to a photoelectric conversion signal output from the image sensor 11. The A/D conversion circuit 13 converts the analog-processed image-capturing signal into the digital signal.

The main CPU 18 performs a predetermined calculation by inputting signals from the respective blocks, and outputs the control signal based on the calculated results to the respective blocks. An image processing circuit 16 is formed as an ASIC, for example, to perform an image processing with respect to the digital image signals input from the A/D conversion circuit 13. The image processing includes the edge enhancement, the color temperature (white balance) adjustment, the format conversion with respect to the image signal and the like.

An image compression circuit 17 performs the image compression with respect to the image signal processed by the image processing circuit 16 at a predetermined compression ratio through the JPEG. A display image producing circuit 20 produces display data to display the captured image on the LCD monitor 21.

The recording medium 30 is formed as a memory card that can be detachably set to the electronic camera 10. The recording medium 30 stores the captured image data and the image file that contains the information of the captured image in response to the command from the main CPU 18. The image file stored in the recording medium 30 is readable in response to the command from the main CPU 18.

The recording medium 30 further stores the PJ file group including the information and data required for the scenario playback and the MUSIC file group including the audio data information which allows the audio playback in response to the command from the main CPU 18. The PJ file group and the MUSIC file group stored in the recording medium 30 are readable and changeable (updating the recorded contents) in response to the command from the main CPU 18.

A buffer memory 19 is used to temporarily store the data before and after or in the middle of the image processing, and to store the image file prior to being recorded in the recording medium 30, and to store the image file read from the recording medium 30.

An operation member 22 corresponds to an operation button and the like of the electronic camera 10, through which an operation signal produced in response to depressing operation of the corresponding button is output to the main CPU 18. An AF unit 24 detects a focus adjustment state of a lens (not shown) for shooting in response to the command output from the main CPU 18. Based on the detection results, the focus lens is driven to move back and forth in the optical axis direction such that the focus adjustment is performed.

An external interface circuit 23 is connected to an external device such as the PC 50 for communication therebetween using a predetermined communication protocol. The electronic camera 10 is allowed to send and receive the data and information within the image file, PJ file and MUSIC file to and from the PC 50 via the external interface circuit 23.

A sound playback unit 25 includes a speaker and an amplifier circuit, and plays back the audio data in response to the command from the main CPU 18.

<Scenario Creation>

The main CPU 18 of the electronic camera 10 displays the first screen (not shown) for the scenario playback mode on the LCD monitor 21 in response to the command to switch to the scenario playback mode via the operation signal from the operation member 22. When the command to "create new scenario" is issued in response to the operation signal from the operation member 22, the scenario creation screen (not shown) is displayed on the LCD monitor 21.

The main CPU 18 produces the PJ file in the recording medium 30 in accordance with the operation signal from the operation member 22. The PJ file corresponds to the playback scenario one by one. In this case, for example, up to 20 files may be produced within a single unit of the recording medium 30. The respective contents of the PJ files may be changed (edited) individually, or the PJ file may be deleted. In production of the PJ file, the main CPU 18 displays the reduced image (thumbnail) of the shot image stored in the recording medium 30 on the LCD monitor 21, and the shot image corresponding to the reduced image selected with the cursor is registered as the image to be displayed in the scenario playback in response to a selective operation signal from the operation member 22.

The PJ file contains the following information A1 to A6.
A1: scenario information;
A2: reduced image data of the image subjected to the scenario playback (corresponding to the thumbnail image);
A3: reduced image data of the top image (representative image);
A4: audio (music) list;
A5: audio (music) data; and
A6: link data of images subjected to the scenario playback.

The scenario information defined as A1 contains data which represent the image to be displayed (appeared) upon the scenario playback, the image appearance order, the display time (timing), the video effect (fade in/out, zoom in/out, panning direction, presence/absence of overlap, color processing), music subjected to the audio playback, the music playback order, playback time, and the sound effect (fade in/out). In the embodiment, the shot image stored in the recording medium 30 is defined as the original image, and the music data stored in the recording medium 30 is defined as the original music such that the scenario playback is performed.

The reduced image data defined as A2 are obtained by re-sizing the original images to conform to the display pixels of the LCD monitor 21 of the electronic camera 10, (320×240 pixels, for example). The information A2 contains the reduced images of all the images to be displayed upon the scenario playback, and is formed of the reduced image of the still image and the reduced image of the movie image corresponding to a predetermined time interval (for 60 seconds, for example).

The reduced image data defined as A3 represent a series of images to be displayed upon the scenario playback, normally, the top image which appears in the first order.

The music list defined as A4 is the information representing the correlation between the music data defined as A5 and the music data contained in the PC 50. The recording medium 30 preliminarily stores the re-sized music data of the music data contained in the PC 50 as the MUSIC file (for example, at sampling frequency of 22 kHz with the sampling bit number of 8). The music list A4 stores the information which represents the music data (high sound quality version) stored in the PC 50 corresponding to the music data (re-size version) stored in the electronic camera 10.

The music data defined as A5 contain individual music data subjected to the audio playback, respectively. The electronic camera 10 stores the designated music data among those contained in the MUSIC file as the information A5 in the PJ file in response to the operation signal from the operation member 22. The link data defined as A6 are the image list information data about the position at which the shot image (original image) file to be used for the scenario playback is stored.

<Scenario Playback in Electronic Camera>

The main CPU 18 selects the PJ file in response to the operation signal from the operation member 22. During the selection, the representative image (information A3) is read from the corresponding PJ file so as to be displayed on the LCD monitor 21. The main CPU 18 starts the scenario playback based on the contents of the information data A1 to A6 within the selected PJ file in response to the "scenario playback" command through the operation signal from the operation member 22.

The scenario playback is performed by the electronic camera 10 at the simple mode. In this mode, the reduced image data of the original images are played back. Further the audio playback is performed with respect to the re-size version of the music data. As the reduced image data of the information A2 are used in the mode, they do not have to be re-sized to be displayed conforming to the display pixels on the LCD monitor 21.

<Scenario Transfer>

In the embodiment, the information required for allowing the PC 50 to perform the scenario playback is transferred from the electronic camera 10 to the PC 50. Specifically, the information data A1, A2 and A4 corresponding to each PJ file, and the required original image data file are transmitted.

Figure 3:
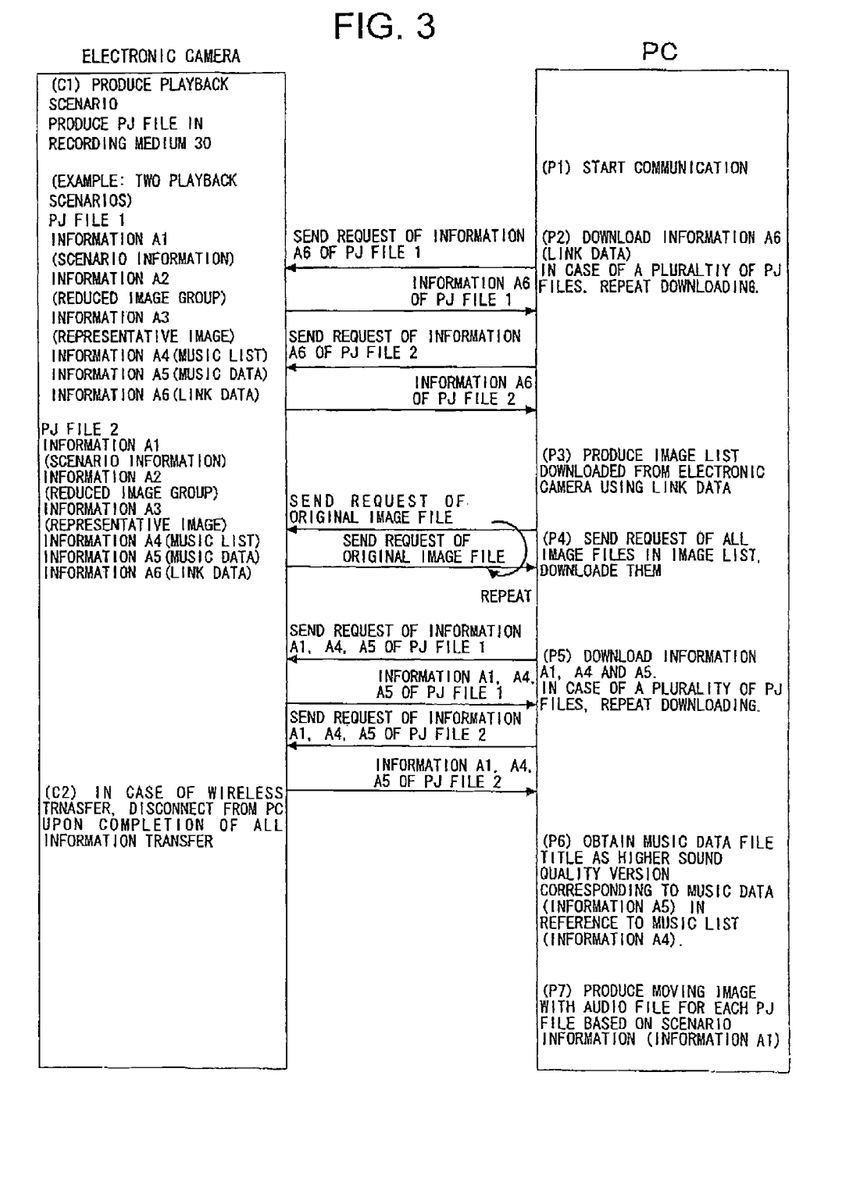
FIG. 3 is an explanatory view showing the flow of the data transfer between the electronic camera and the PC.

FIG. 3 is an explanatory view showing the flow of the data transfer process between the electronic camera 10 and the PC 50. Referring to FIG. 3, the electronic camera 10 creates the playback scenario as described above, and stores the created playback scenario in the recording medium 30 as the PJ file (C1). The PJ file contains the information data A1 to A6. All the produced PJ files may be transferred, or only the commanded PJ file may be transferred. Alternatively, the newly produced PJ file or edited PJ file among those produced may be transferred. In the embodiment, an exemplary transmission of the PJ files 1 and 2 will be described.

The electronic camera 10 transmits the information and data, respectively in response to the request from the PC 50. In the case where the transmission is performed through the wireless communication via the wireless terminal as described above, the communication ends when the transmission of all the data is completed, and the wireless connection is cut (C2).

Meanwhile, the PC 50 executes the moving image file producing/playback program, and starts the communication with the electronic camera 10 in response to the command to perform the scenario transfer thereto (P1). In the embodiment, the scenario transfer of the PJ files 1 and 2 is commanded.

The PC 50 sends the request of the information A6 (link data) with respect to the PJ file 1 to the electronic camera 10. The PC 50 receives the link data with respect to the PJ file 1 transmitted from the electronic camera 10 in response to the request, and downloads such data (P2). Likewise, the PC 50 sends the request of the information A6 (link data) with respect to the PJ file 2 to the electronic camera 10. The PC 50 receives the link data with respect to the PJ file 2 transmitted from the electronic camera 10 in response to the request.

The PC 50 produces the image list (list of images used for the scenario playback) which contains images to be downloaded from the electronic camera 10 using the obtained link data (P3). If the same image exists in both the PJ files 1 and 2, such image may be counted as one image in the image list so as to prevent downloading of the same image twice from the electronic camera 10 to the PC 50.

The PC 50 sends the request of the shot (photographed) image (original image) file on the above-produced image list to the electronic camera 10. The PC 50 receives the image file transmitted from the electronic camera 10 in response to the request, and downloads such file (P4). Likewise, the PC 50 sends the request of the other image file on the image list to the electronic camera 10. The PC 50 receives the image file transmitted from the electronic camera 10 in response to the request, and downloads such file. In this way, the aforementioned process is repeatedly performed until all the original files on the image list are obtained.

In the aforementioned case, upon production of the image list, the duplicated transmission of the image which exists both in the PJ files 1 and 2 may be prevented. Meanwhile, in the case where the required original image file has been already stored in the memory unit of the PC 50, such image file may be deleted from the image list. Specifically, the required original image file may be read from the memory unit of the PC 50 rather than from the electronic camera 10.

The PC 50 sends the request of the information A1 (scenario information), A4 (music list) and A5 (music data) with respect to the PJ file 1 to the electronic camera 10. The PC 50 receives the scenario information, the music list and the music data with respect to the PJ file 1 transmitted from the electronic camera 10 in response to the request, and downloads those information data (P5). Likewise, the PC 50 sends the request of the information A1 (scenario information), A4 (music list) and A5 (music data) with respect to the PJ file 2 to the electronic camera 10. The PC 50 receives the scenario information, the music list and the music data with respect to the PJ file 2 transmitted from the electronic camera 10 in response to the request, and downloads those information data.

The PC 50 obtains the title of the music data file as the high sound quality version in reference to the music list such that the music data as the high sound quality version are used for forming the moving image file (described later) instead of the music data as the re-size version obtained from the electronic camera 10 (P6). Then the verification is performed whether the memory unit stores the music data with high sound quality corresponding to the music data as the re-size version obtained from the electronic camera 10.

<Production of Moving Image File>

The PC 50 disconnects the communication with the electronic camera 10 upon completion of downloading of the required information and data, and produces the moving image files as described below (P7). That is, the scenario information, the required image file and music data are referred with the PJ file corresponding to the playback scenario such that the materials, for example, the original data and the music data are processed to produce the playback image with audio. The resultant series of the moving images are stored in the memory unit within the PC 50 as the moving image files.

Specifically, the image shown in the scenario information is contained in the moving image to be produced based on the appearance order and display period in the scenario information. Upon switching of the image, the video effect shown in the scenario information, for example, fade in/out, zoom in/out, panning direction, presence/absence of overlap, color processing is added. The music shown in the scenario information is contained based on the playback order and the playback period in the scenario information. Upon switching of the music playback, the sound effect shown in the scenario information, for example, the fade in/out is added. Timing for switching the image display and the music playback are synchronized in accordance with the scenario information.

Figure 4:
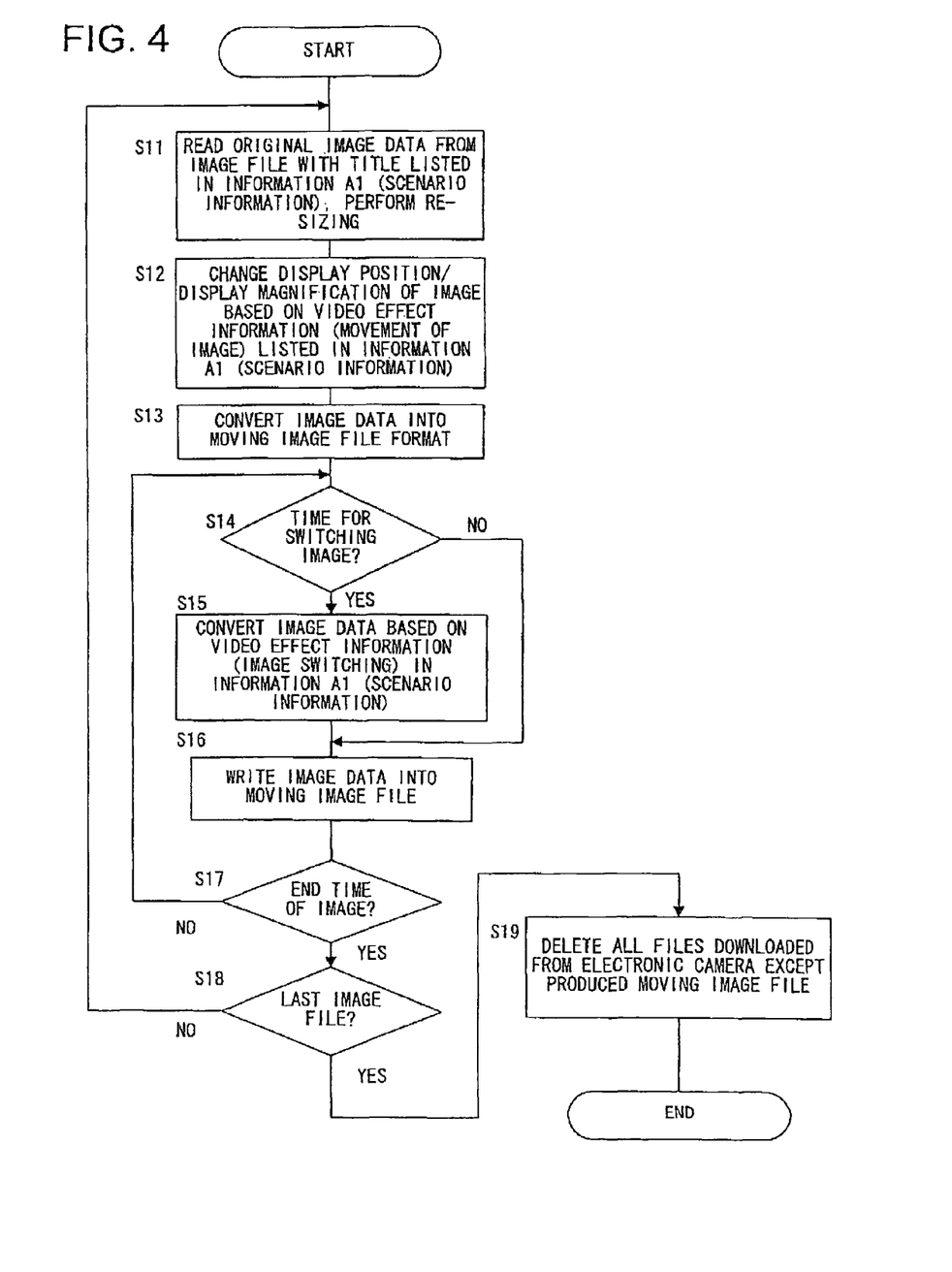
FIG. 4 is a flowchart of a routine for producing the moving image file.

FIG. 4 is a flowchart of a routine for producing the moving image files equivalent to a single scenario in P7. In step S11 of the flowchart shown in FIG. 4, the PC 50 inputs (reads) the original image data from the image file with the title written in the scenario information. The process then proceeds to step S12. If the data size of the original image is larger than the display pixels on the display unit of the PC 50, it is re-sized conforming to the number of the display pixels on the display unit.

In step S12, the PC 50 changes the display position and the display magnification of the image based on the information of the video effect contained in the scenario information (relevant to the movement of the image). The process further proceeds to step S13.

In step S13, the PC 50 converts the processed image data into the format for the moving image file. The process proceeds to step S14 where the PC 50 determines whether it is the timing for switching the image. When the time shown in the scenario information is reached, YES is obtained in step S14 and the process proceeds to step S15. Meanwhile, when the time shown in the scenario information is not reached, NO is obtained in step S14 and the process proceeds to step S16. If NO is obtained in step S14, the same image data will be written into the moving image file continuously in step S16.

In step S15, the PC 50 converts the image data based on the information of the video effect contained in the scenario information (relevant to switching of the image), and the process proceeds to step S16. In the conversion process, the fade in/out, zoom in/out, the panning, overlap, and the color processing may be performed. In the course of proceeding from step S15 to step S16, the PC 50 writes the converted image data into the moving image file. The process then proceeds to step S17.

In step S17, the PC 50 determines whether it is the time at which the image ends. If the end time shown in the scenario information is reached, YES is obtained in step S17, and the process proceeds to step S18. If the end time shown in the scenario information is not reached, NO is obtained in step S17, and the process returns to step S14. If the process proceeds to step S18, the display time shown in the scenario information is reached. If the process returns to step S14, the display time shown in the scenario information is not reached.

In step S18, the PC 50 determines whether it is the last image file. If the image file with the last appearance order shown in the scenario information is read, YES is obtained in step S18, and the process proceeds to step S19. If the image file with the last appearance order shown in the scenario information is not read, NO is obtained in step S18, and the process returns to step S11. If the process proceeds to step S19, all the images shown in the scenario information have appeared. If the process returns to step S11, all the images shown in the scenario information have not appeared yet.

In step S19, the PC 50 stores a series of produced moving image files in its memory unit, and deletes all the information data (information A6, A1, A4 and A5) from those downloaded from the electronic camera 10 in the process shown in FIG. 3. The process shown in FIG. 4 then ends.

The PC 50 produces the moving image file while playing back the aforementioned image processing on the work memory. The aforementioned moving image file is not produced while performing the playback real time, but produced through high speed processing using the full capacity of the CPU. PC 50 repeats the process for producing the moving image files shown in FIG. 4 with respect to the PJ files 1 and 2, respectively so as to store the produced moving image files.

<Scenario Playback in PC>

Figure 6:
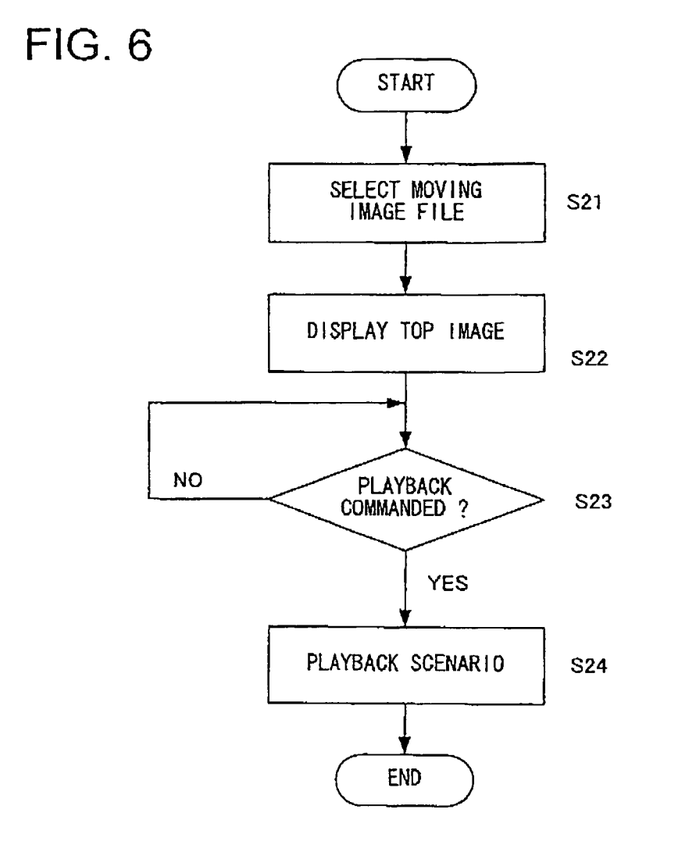
FIG. 6 is a flowchart of a routine for the scenario playback performed by the PC.

FIG. 6 is a flowchart of a routine for the scenario playback performed in the PC 50. The PC 50 selects the preliminarily produced moving image file in accordance with the operation signal from the keyboard operated by the user (viewer) in step S21. In the case where a plurality of moving image files are produced, one moving image file is selected from those files. Upon the selecting operation, the top image from the corresponding moving image file is read so as to be displayed on the display unit in step S22. When the scenario playback is commanded in step S23, the PC 50 starts the playback of the commanded moving image file in step S24. The PC 50 performs the full scenario playback using the music data as the high sound quality version instead of the music data as the re-size version used for the simple scenario playback performed by the electronic camera 10 such that the sound quality of the audio playback is higher than that in the playback performed by the electronic camera 10. The re-sizing process has been performed when the moving image file is produced, requiring no further execution of the other command process while performing the playback.

According to the foregoing embodiment, the following advantageous effects may be obtained.

(1) The material such as the shot (photographic) image (original image) and the music data is processed based on the scenario information so as to preliminarily produce the playback image with audio, which may be stored as a series of the moving image files. The scenario playback may be performed by the PC which only plays back the aforementioned moving image files. The material does not have to be processed while performing the image display and the audio playback. As a result, the delay in the display timing hardly occurs even if the capacity of the CPU of the PC 50 is relatively low.

(2) The aforementioned material is transmitted from the electronic camera 10 to the PC 50. In the case where the PC 50 contains the material (the music data as the high sound quality version corresponding to the re-size version) with the quality higher than the one obtained from the electronic camera 10 (for example, the music data as the re-size version), the PC 50 uses the material with the higher quality to be processed instead of the material obtained from the electronic camera 10. This allows the PC 50 to perform the audio playback with the sound quality higher than that in the scenario playback performed by the electronic camera 10.

(3) Prior to transmission of the material, the electronic camera 10 transmits the material information to the PC 50 (in the aforementioned example, the information A6 (link data)) such that the PC 50 uses the obtained material information to produce the material list to be downloaded from the electronic camera 10 (image file list required for performing the scenario playback). This makes it possible to prevent duplicated transmission of the same material (image file) from the electronic camera 10 to the PC 50, thus reducing the communication time.

(4) The aforementioned processing is performed in units of the scenario (that is, by the PJ file). In the case where a plurality of the scenarios exist, the PC 50 obtains the material required for all the scenarios from the electronic camera 10, and then the communication between the PC 50 and the electronic camera 10 is terminated. Then the moving image files are produced by the respective scenarios. This allows the electronic camera 10 to sequentially transmit the other scenario materials to the PC 50 without waiting until the PC 50 completes formation of the moving image files. This makes it possible to reduce the communication time. The communication of the PC 50 with the electronic camera 10 ends to reduce the power consumption required for the wireless connection.

(5) The scenario playback is performed by the electronic camera 10 at the simple mode, and the scenario playback is performed by the PC 50 at the full mode. This makes it possible to perform the playback in accordance with the capacity of the CPU to be employed.

MODIFIED EXAMPLE 1

The aforementioned PC 50 is structured to obtain the information data A1 (scenario information), A4 (music list), A5 (music data) and A6 (link data) for one PJ file from the electronic camera 10. Alternatively, however, all the information data from A1 to A6 may be obtained.

MODIFIED EXAMPLE 2

The aforementioned PC 50 is structured to obtain all the music data of the information A5 from the electronic camera 10. Alternatively, the information A4 (music list) may be obtained in advance. If it is determined that the PC 50 contains no music data as the high sound quality version corresponding to the music list that has been referred, only the music data which are not contained in the PC 50 are obtained from the electronic camera 10.

MODIFIED EXAMPLE 3

In the embodiment, the PJ file corresponding to the playback scenario is produced by the electronic camera 10 (see C1 of FIG. 3). However, the PC 50 is allowed to produce the PJ file.

MODIFIED EXAMPLE 4

In the embodiment, the material is transmitted from the electronic camera 10 to the PC 50. However, in the case where the required materials have been preliminarily contained in the PC 50, the material does not have to be transmitted. In this case, the PC 50 is structured to produce the PJ file such that the PC 50 by itself serves as the moving image file producing/playback apparatus.

MODIFIED EXAMPLE 5

In the embodiment, the moving image with audio file is produced. However, only the image file having the music data omitted may be produced.

The above described embodiments are examples, and various modifications can be made without departing from the spirit and scope of the invention.

What is claimed is:

1. A moving image file producing method comprising:
    capturing, by an electronic camera, one still image;
    storing, by the electronic camera, the one still image and a reduced image corresponding to the one still image into a non-transitory recording medium;
    producing, by the electronic camera, a scenario information containing information representing a video effect for displaying the one still image;
    enabling, by the electronic camera, playback of the one still image by using the scenario information and the reduced image in the electronic camera;
    inputting, by a computer, the scenario information from the electronic camera;
    requesting, by the computer, the electronic camera based on the scenario information to send an image material including the one still image;
    inputting, by the computer, the image material from the electronic camera;

requesting, by the computer, the electronic camera based on the scenario information to send a music material;

inputting, by the computer, the music material from the electronic camera;

determining, by the computer, whether a memory unit of the computer stores a high-sound-quality music material corresponding to the music material input from the electronic camera;

selecting the music material input from the electronic camera, or the high-sound-quality music material stored in the memory unit of the computer instead of the music material input from the electronic camera if the computer determines that the high-sound-quality music material is stored in the memory unit of the computer;

converting, by the computer, data of the one still image included in the image material and audio data included in the selected music material into data of a moving image in which the one still image is shown dynamically, based upon the video effect defined for the one still image, the data of the moving image having a moving image file format;

writing, by the computer, the converted data of the moving image into a moving image file that enables playback of the data of the moving image without processing the data of the one still image in real time; and storing, by the computer, the moving image file into the memory unit of the computer in advance to be used for playback later.

2. The moving image file producing method according to claim 1, wherein:
the scenario information further contains information representing the image material to be contained in the moving image file, an appearance order of the image material, and a display time of the image material.

3. The moving image file producing method according to claim 1, wherein:
a process of converting the data of the one still image into the data of the moving image is started upon completion of an input operation of the material from the electronic camera.

4. The moving image file producing method according to claim 1, wherein:
the input image material is re-sized conforming to a display unit to be used for a playback operation if producing the moving image file.

5. The moving image file producing method according to claim 1, further comprising:
playing back, by the computer, the moving image file in response to a command from a user.

6. The moving image file producing method according to claim 1, further comprising:
deleting, by the computer, the input image material and scenario information after producing the moving image file.

7. The moving image file producing method according to claim 1, wherein:
the scenario information further contains information representing the music material to be contained in the moving image file, a playback order of the music material, a playback time of the music material, and a sound effect to be added.

8. The moving image file producing method according to claim 1, wherein:
the computer converts the data of the one still image included in the image material into the data of the moving image based upon the video effect defined for the one still image if switching a display of a still image from one still image to another still image.

9. The moving image file producing method according to claim 1, wherein
the image material includes data of at least one still image and link data; and
the music material includes audio data and an audio list.

10. The moving image file producing method according to claim 1, wherein:
the playback of the one still image executed at the electronic camera based on the scenario information is simpler than the playback of the one still image executed at the computer based on the scenario information.

11. An electronic camera comprising:
a scenario information producing unit that produces scenario information used for the moving image file producing method according to claim 1.

12. An electronic camera system comprising:
a computer; and
an electronic camera that is connected to the computer, wherein
the computer and the electronic camera respectively execute steps of a moving image file producing method according to claim 1.

13. The electronic camera system according to claim 12, wherein
the electronic camera comprises a scenario information producing unit that produces the scenario information transmitted to the computer.

14. A moving image file producing method, comprising:
capturing, by an electronic camera, one still image;
storing, by the electronic camera, the one still image and a reduced image corresponding to the one still image into a non-transitory recording medium;
producing, by the electronic camera, a scenario information containing information representing a video effect for displaying the one still image;
enabling, by the electronic camera, playback of the one still image by using the scenario information and the reduced image in the electronic camera;
inputting, by a computer, the scenario information from the electronic camera;
requesting, by the computer, the electronic camera based on the scenario information to send an image material including the one still image;
inputting, by the computer, the image material from the electronic camera;
converting, by the computer, data of the one still image included in the image material into data of a moving image in which the one still image is shown dynamically, based upon the video effect defined for the one still image, the data of the moving image having a moving image file format;
writing, by the computer, the converted data of the moving image into a moving image file that enables playback of the data of the moving image without processing the data of the one still image in real time; and
storing, by the computer, the moving image file into a memory unit of the computer in advance to be used for playback later, wherein:
the computer determines whether the image material that the computer requests the electronic camera based on the scenario information to send is already stored in the memory unit of the computer before requesting the electronic camera to send the image material; and
if the computer determines that the image material is already stored in the memory unit of the computer, the computer reads out the image material from the memory unit of the computer instead of inputting the image material from the electronic camera.

* * * * *